(12) United States Patent
Luo et al.

(10) Patent No.: US 12,142,403 B2
(45) Date of Patent: Nov. 12, 2024

(54) ANISOTROPIC BONDED MAGNET AND PREPARATION METHOD THEREOF

(71) Applicants: GRIREM HI-TECH CO., LTD., Hebei (CN); GRIREM ADVANCED MATERIALS CO.,LTD., Beijing (CN); Grirem (Rongcheng) Co., Ltd., Shandong (CN)

(72) Inventors: Yang Luo, Beijing (CN); Yuanfei Yang, Beijing (CN); Zilong Wang, Beijing (CN); Dunbo Yu, Beijing (CN); Jiajun Xie, Beijing (CN); Kaiwen Wu, Beijing (CN); Yifan Liao, Beijing (CN); Jichen Jia, Beijing (CN)

(73) Assignees: GRIREM HI-TECH CO., LTD., Langfang (CN); GRIREM ADVANCED MATERIALS CO., LTD., Beijing (CN); Grirem (Rongcheng) Co., Ltd., Weihai (CN)

( * ) Notice: Subject to any disclaimer, the term of this patent is extended or adjusted under 35 U.S.C. 154(b) by 0 days.

(21) Appl. No.: 17/331,544

(22) Filed: May 26, 2021

(65) Prior Publication Data
US 2021/0375512 A1 Dec. 2, 2021

(51) Int. Cl.
H01F 1/055 (2006.01)
H01F 1/057 (2006.01)
(Continued)

(52) U.S. Cl.
CPC ......... H01F 1/0551 (2013.01); H01F 1/0576 (2013.01); H01F 1/058 (2013.01);
(Continued)

(58) Field of Classification Search
CPC ........ H01F 1/0551; H01F 1/0576; H01F 7/02; H01F 41/0266; H01F 1/059;
(Continued)

(56) References Cited

U.S. PATENT DOCUMENTS

| 2005/0145301 A1 | 7/2005 | Honkura | |
| 2013/0069747 A1* | 3/2013 | Honkura | H01F 1/083 156/245 |
| 2021/0134499 A1* | 5/2021 | Luo | B22F 1/102 |

FOREIGN PATENT DOCUMENTS

| CN | 110783052 A | 2/2020 |
| JP | H0464202 A | 2/1992 |

(Continued)

OTHER PUBLICATIONS

JP-05152116-A: Espacenet English machine translation (Year: 1993).*

Primary Examiner — Adil A. Siddiqui
(74) Attorney, Agent, or Firm — Westbridge IP LLC

(57) ABSTRACT

An anisotropic bonded magnet and a preparation method thereof are provided. Through a method of stacking magnets which are different in content of SmFeN and/or have different densities, the magnets in the middle have high properties and the magnets at two ends and/or the periphery have low properties, thereby compensating for a property deviation caused by a difference in densities during a pressing process, and improving the property uniformity of the magnets in an axial direction. The method avoids the phenomenon of non-uniform magnetic field orientation and density in a height direction during orientation and densification as well as the phenomenon of low in the middle and high at two ends.

7 Claims, 1 Drawing Sheet

(51) Int. Cl.
    *H01F 1/058*       (2006.01)
    *H01F 1/059*       (2006.01)
    *H01F 1/113*       (2006.01)
    *H01F 7/02*        (2006.01)
    *H01F 41/02*       (2006.01)

(52) U.S. Cl.
    CPC ............. *H01F 1/059* (2013.01); *H01F 1/113* (2013.01); *H01F 7/02* (2013.01); *H01F 41/0266* (2013.01); *H01F 41/0273* (2013.01); *H01F 41/0293* (2013.01); *H01F 1/0558* (2013.01); *H01F 1/0578* (2013.01); *Y02T 10/64* (2013.01)

(58) Field of Classification Search
    CPC .. H01F 41/0273; H01F 1/0578; H01F 1/0558; H01F 1/058; H01F 1/113
    See application file for complete search history.

(56) References Cited

FOREIGN PATENT DOCUMENTS

| | | | | |
|---|---|---|---|---|
| JP | 05152116 A | * | 6/1993 | ........... H01F 1/0578 |
| JP | H0661023 A | | 3/1994 | |
| JP | H1055914 A | | 2/1998 | |
| JP | H11186027 A | | 7/1999 | |
| JP | 2005268385 A | | 9/2005 | |
| JP | 2005310853 A | | 11/2005 | |
| JP | 2007035667 A | | 2/2007 | |
| WO | 03085684 A1 | | 10/2003 | |

\* cited by examiner

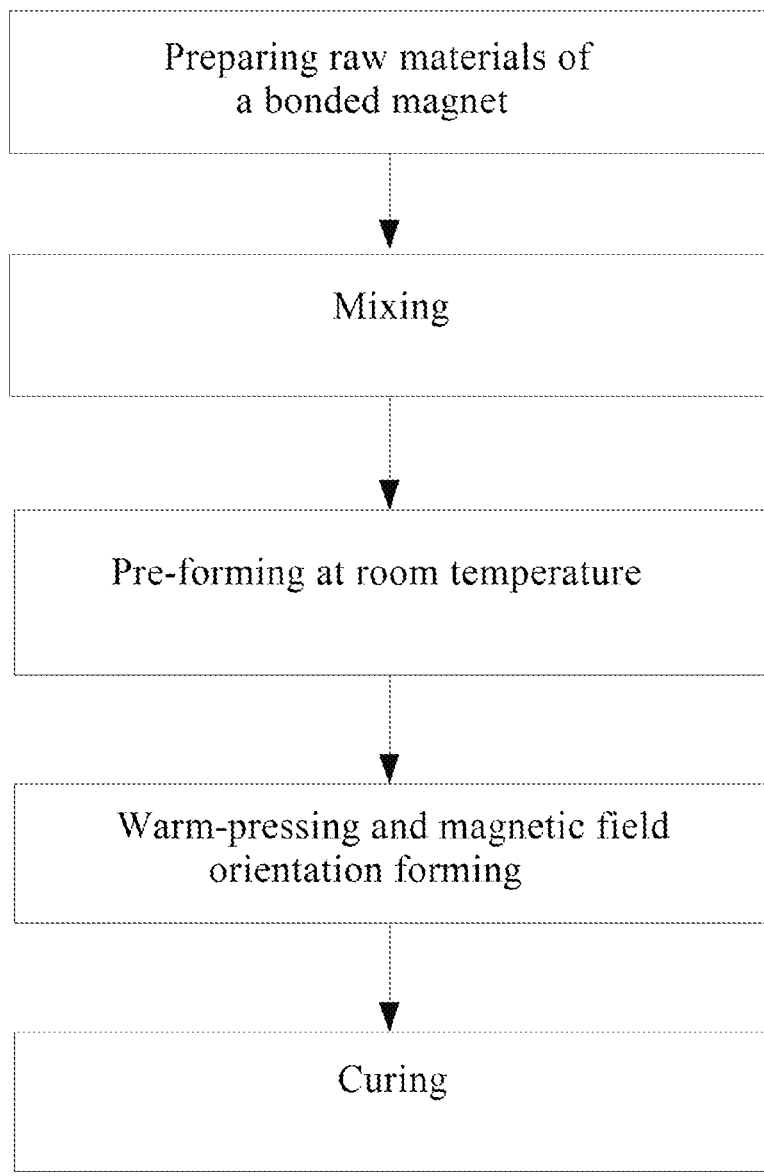

ANISOTROPIC BONDED MAGNET AND PREPARATION METHOD THEREOF

CROSS REFERENCE TO RELATED APPLICATION

The present application is filed based on and claims priority from the Chinese Patent Application 202010483305.8 filed May 29, 2020, the content of which is incorporated herein in the entirety by reference.

TECHNICAL FIELD

The present invention relates to the technical field of bonded magnet materials, and in particular, to an anisotropic bonded magnet and a preparation method thereof.

BACKGROUND

Bonded permanent magnets have good processability and a high shape degree-of-freedom and dimensional accuracy, have no need for secondary processing and thus have become indispensable important elements of modern high-tech products and are widely used in the fields of electronic information, computers, motors, automobiles and the like. In addition, since an anisotropic bonded magnet has a more excellent magnetic property and can effectively promote miniaturization, efficiency, energy saving and light weight of electronic products, it becomes a trend of the bonded permanent magnets.

Forming methods of the bonded permanent magnet include compression molding, calendaring molding, injection molding, and extrusion molding. As the compression molded magnet has the highest magnetic property, the compression molding is the most widely used.

The basic process flow of preparing the anisotropic bonded magnet from a thermosetting resin by compression molding is as follows:

acquisition of a composite magnetic powder by mixing a magnetic powder with a binder and an additive→orienting and pressing→demagnetization→curing→anti-corrosion treatment→property detection. The additive refers to a lubricant, a coupling agent or the like; and the binder generally is a thermosetting resin such as an epoxy resin, a phenol resin, etc. An orientation forming process may have three forms: forming at room temperature, warm-pressing forming, and multi-step forming. For the anisotropic bonded magnet prepared by forming at the room temperature, the magnetic property is lower due to the lower magnet density and poor degree of orientation. In a warm-pressing forming process, the binder is softened and melted to be viscous due to high temperature, has certain lubrication effect due to its low viscosity and thus achieves the purposes of reducing both the rotation resistance of magnetic powder particles and the frictional resistance between the magnetic powder and mold walls during orientation. Further, the degree of orientation and density of the magnet are effectively increased. A warm-pressing forming technology is widely used in the preparation of anisotropic bonded magnets at present. Therefore, the key of preparing the anisotropic bonded permanent magnet is to increase the degree of orientation and density.

In the prior art, CN101599333A provides a method for manufacturing an anisotropic multi-pole magnetic ring by dry-pressing forming. In this method, a magnetic powder is subjected to wet pulverization, and one or more binders and lubricants are added to the dried magnetic powder; then pre-pressing and pre-magnetization are performed; afterwards, mixing is performed with a high-speed pulverizer; and finally, double-sided isotactic molding is performed on the above powder in a radial magnetic field.

CN101814368A provides a method of preparing an anisotropic magnet: adjusting a particle size of a powder, wherein a first mixture is composed of a first magnetic powder having a particle size of more than 20 μm and less than 150 μm, a thermosetting resin with the added amount of less than 2.0 wt. % in the anisotropic bonded magnet, and a first additive; and a second mixture is composed of a second magnetic powder having a particle size of more than 1 μm and less than 20 μm, and a second additive. The method is used to improve the magnet density and magnetic properties. However, a difference between the magnetic field intensity of a center portion and the magnetic field intensity of ends of the magnet is 5% or more.

CN103489621A provides a method of preparing an anisotropic bonded magnet by mold pressing. A two-step forming process is adopted, that is, the method is a method for preparing an anisotropic bonded magnet by pre-forming at room temperature and an orientation, densification and warm-pressing forming process. During orientation and densification, the phenomenon of non-uniform magnetic field orientation and density in a height direction exists and the phenomenon of low in the middle and high at two ends appears.

CN107393709A provides a method of preparing an anisotropic bonded magnet having a high degree of orientation by cold isostatic pressing. In this method, a thermosetting resin and a curing agent are prepared into a binder, an anisotropic bonded magnetic powder is added to a binder solution, the mixture is fully stirred before being injected into a silicone mold for vacuum sealing, orientation is performed at a magnetic field of 1.5-2 T, and then the magnet is prepared by cold isostatic pressing.

In industrial production, for magnetic rings having a high aspect ratio, an existing technology of directly filling a mold cavity with a magnetic powder in a high-temperature magnetic field will lead to the larger height of the magnetic powder in the mold cavity. As a result, it is easy to cause the non-uniform magnetic field orientation along the height direction. In addition, the heating of the mixed magnetic powder during filling at the high temperature easily causes the phenomenon of adhesion of the magnetic powder to the wall, and thus it is difficult to ensure uniformity of the filler. Consequently, the uniformity of the magnetic properties and dimensional accuracy of the magnet are affected.

SUMMARY

The object of the present invention lies in that for the problem of property non-uniformity caused by the phenomenon of low density in the middle and high density at two ends or the periphery in an axial direction in the process of preparing a magnet having a high aspect ratio, through a method of stacking a plurality of magnets and mixing an SmFeN powder in the magnets, the magnets in the middle have a high content of SmFeN powder and the magnets at two ends and/or the periphery have a low content of SmFeN powder, thereby compensating for a property deviation caused by a difference in densities during a pressing process, and improving the property uniformity of the magnets in the axial direction.

To achieve the above object, the present invention adopts the following solutions.

A first aspect of the present invention provides an anisotropic bonded magnet. The anisotropic bonded magnet includes an R-T-B type permanent magnetic powder and an SmFeN permanent magnetic powder, wherein in the R-T-B type permanent magnetic powder, the content of R is 28-31 wt. %, the content of B is 0.9-1.1 wt. %, and the balance is T; R is selected from one and more rare earth elements, T includes Fe or FeCo and a small amount of transitional metal, and B is boron;

the content of the SmFeN permanent magnetic powder is 3%-40% of the weight content of the R-T-B permanent magnetic powder; and the anisotropic bonded magnet is formed by pressing a plurality of different preforms, and the resulting anisotropic bonded magnet has a density deviation of less than 2% in a pressing direction.

Further, the plurality of different preforms includes preforms which are different in content of SmFeN permanent magnetic powder.

Further, R is one element or two or more elements selected from the group consisting of Y, Pr, Nd, Pm, Sm, Eu, Gd, Tb, Ho, Er, Tm, Yb and Lu, and is preferably Nd or PrNd.

Further, the bonded magnet is a bonded magnetic ring having an aspect ratio of greater than 0.6, preferably 1.0-10, and further preferably 2-8, and a wall thickness of greater than 1 mm, preferably 1-20 mm, and further preferably 1-5 mm.

Further, the SmFeN permanent magnetic powder has a particle size of 1-30 µm, preferably 3-10 µm.

A second aspect of the present invention provides a preparation method of an anisotropic bonded magnet. The preparation method includes the following steps:

step 1, preparing raw materials of the bonded magnet, wherein the raw materials include an R-T-B type permanent magnetic powder, an SmFeN permanent magnetic powder, a thermosetting resin binder, a coupling agent and a lubricant, wherein the weight content of the R-T-B type permanent magnetic powder and the SmFeN permanent magnetic powder is 100, the weight content of the SmFeN permanent magnetic powder is 3%-40% of the weight content of the R-T-B type permanent magnetic powder, the weight content of the binder is 1.0%-6.0%, preferably 2.5%-3.5% of the weight content of the R-T-B type permanent magnetic powder and the SmFeN permanent magnetic powder, the weight content of the coupling agent is 0.05%-1.0%, preferably 0.1%-0.3% of the weight content of the R-T-B type permanent magnetic powder and the SmFeN permanent magnetic powder, and the weight content of the lubricant is 0.05%-2.0%, preferably 0.05%-0.50% of the weight content of the R-T-B type permanent magnetic powder and the SmFeN permanent magnetic powder;

step 2, mixing: uniformly mixing the R-T-B type permanent magnetic powder and the SmFeN permanent magnetic powder in the raw materials with the thermosetting resin binder, the coupling agent and the lubricant to acquire a composite magnetic powder;

step 3, pre-forming at room temperature: putting the dried composite magnetic powders having different magnetic properties in a first mold and then placing the first mold in a magnetic field $H_1$ for press-forming to acquire a plurality of different preforms, wherein a pressing pressure is 100-600 MPa, the magnetic field $H_1$ is less than 0.15 T, and a pressing temperature is room temperature;

step 4, warm-pressing and magnetic field orientation forming: stacking and putting the plurality of different preforms in a second mold and placing the second mold in a magnetic field $H_2$ for warm-pressing forming and orientation; performing pressing again; and afterwards, performing demagnetization, cooling and demolding to acquire an anisotropic bonded magnet subjected to warm-pressing and magnetic field orientation forming, wherein the intensity of the magnetic field $H_2$ is 0.6-3 T, a pressing pressure is 300-1000 MPa, and a forming temperature is 60-200° C.; and step 5, curing: heating the anisotropic bonded magnet subjected to warm-pressing and magnetic field orientation forming to certain temperature and then performing heat preservation, wherein the heat preservation temperature is 100-200° C., preferably 120-180° C. and the heat preservation time is 0.5-2 hours.

Further, the step 2 includes:

dissolving the coupling agent metered in the above step in a corresponding organic solvent, and then uniformly mixing the same with the R-T-B type permanent magnetic powder and the SmFeN permanent magnetic powder, so that the surfaces of the permanent magnetic powders are coated with the coupling agent uniformly after the organic solvent is removed through volatilization; and then dissolving the metered binder and lubricant in a corresponding organic solvent, and then uniformly mixing the same with the R-T-B type permanent magnetic powder and the SmFeN permanent magnetic powder which are coated with the coupling agent, so that the composite magnetic powder required for preparing the bonded magnet is acquired after the organic solvent is removed.

Further, the plurality of different preforms includes a first preform and a second preform, wherein the first preform is prepared from a composite magnetic powder with a lower content of SmFeN permanent magnetic powder, and the second preform is prepared from a composite magnetic powder with a higher content of SmFeN permanent magnetic powder; and the mass percentage content of SmFeN in the composite magnetic powder with the lower content of SmFeN permanent magnetic powder is 3-15%, preferably 5-13%, and the mass percentage content of SmFeN in the composite magnetic powder with the higher content of SmFeN permanent magnetic powder is 15-40%, preferably 15-30%.

Further, the first preform has a density less than that of the second preform and the ratio of the densities of the first preform and the second preform is 1:1.1-1:1.5.

Further, stacking and putting the plurality of different preforms in the second mold in the step 4 includes: putting the second preform in the middle and the first preforms at two ends, wherein the second preform in the middle has a length less than that of the first preforms at the two ends.

Further, stacking and putting the plurality of different preforms in the second mold in the step 4 includes: putting the second preform in the center and the first preforms at the periphery.

Further, stacking and putting the plurality of different preforms in the second mold includes: the densities and/or SmFeN contents of the preforms arranged from the middle to two ends gradually decrease; or the densities and/or SmFeN contents of the preforms arranged from the center to the periphery gradually decrease.

Further, in the step 4, a rate of gap between the preform and a warm-pressing and magnetic field orientation forming mold is 0.5-40%, preferably 3.5%-25%.

Further, the first preform and the second preform are magnetic cylinders or magnetic rings having the same shape, and the ratio of the number of the first preforms to the number of the second preforms is 1:1-10:1.

In summary, the anisotropic bonded magnet and the preparation method thereof according to the present invention are provided. Through the method of stacking magnets which are different in content of SmFeN and/or density, the magnets in the middle have high properties and the magnets at two ends and/or the periphery have low properties, thereby compensating for the property deviation caused by the difference in pressing densities during the pressing process, and improving the property uniformity of the magnets in the axial direction. The method avoids the phenomenon of non-uniform magnetic field orientation and density in a height direction during orientation and densification as well as the phenomenon of low in the middle and high at two ends. The anisotropic bonded magnet prepared by this method has the characteristic that a density deviation in a pressing direction is less than 2%; and the degree of orientation and density of the magnet as well as the property uniformity and the dimensional accuracy of the magnet are effectively improved.

BRIEF DESCRIPTION OF THE DRAWINGS

FIG. 1 is a flowchart of a preparation method of an anisotropic bonded magnet according to an embodiment of the present invention.

DETAILED DESCRIPTION

For clearer descriptions of the object, technical solutions and advantages in the present invention, the present invention is described in further detail below with reference to specific embodiments. It should be understood that the description is merely exemplary and is not intended to limit the scope of the present invention. In addition, in the following description, the description of well-known structures and technologies are omitted to avoid unnecessarily confusing the concepts of the present invention.

A first aspect of the present invention provides an anisotropic bonded magnet. The bonded magnet includes an R-T-B type permanent magnetic powder and an SmFeN permanent magnetic powder which are prepared by an HDDR method. In the R-T-B type permanent magnetic powder, the content of R is 28-31 wt. %, the content of B is 0.9-1.1 wt. %, and the balance is T. R is selected from one and more rare earth elements, T includes Fe or FeCo and a small amount of transitional metal, and the content of the transitional metal is less than 3%; and B is boron. The content of the SmFeN permanent magnetic powder is 5%-30% of the weight content of the R-T-B permanent magnetic powder. The anisotropic bonded magnet is formed by pressing a plurality of different preforms, and the resulting anisotropic bonded magnet has a density deviation of less than 2% in a pressing direction.

Further, the plurality of different preforms includes preforms which are different in content of SmFeN permanent magnetic powder.

Further, the rare earth element R constituting the R-T-B type permanent magnetic powder of the present invention may be one element or two or more elements selected from the group consisting of Y, Pr, Nd, Pm, Sm, Eu, Gd, Tb, Ho, Er, Tm, Yb and Lu, and is preferably Nd or PrNd for reasons of cost and magnetic property.

The element T constituting the R-T-B type rare-earth magnet powder of the present invention is Fe or FeCo. The amount of T in average composition of the powder is the balance except other elements constituting the powder. In addition, the Curie temperature may be increased by adding Co as a replacement element of Fe, but too much Co will lead to a decrease of the residual magnetic flux density of the powder. The residual magnetic flux density Br may be increased by adding a transitional element as a replacement element of Fe, but too many transitional elements will passivate the hydrogenation reaction in an HDDR process and thus affect the magnetic properties.

Further, the bonded magnet may have many shapes, the further description is given by taking a bonded magnetic ring as an example, but it is not limited to the bonded magnetic ring. The density of the bonded magnetic ring determines its magnetic property. For a magnetic ring with an aspect ratio, a pressing process of the magnetic ring determines an axial density deviation and the density deviation will lead to the magnetic property non-uniformity of the magnetic ring in an axial direction, thereby affecting the output stability of a motor after the magnetic ring is assembled. The bonded magnetic ring according to the present invention has a density deviation of less than 2% along a pressing direction, which fully ensures the property uniformity of the magnetic ring and the output stability of the motor after assembly. The bonded magnetic ring according to the present invention has an aspect ratio of greater than 0.6, preferably 1.0-10, and further preferably 2-8. For a magnetic ring with a small aspect ratio (less than 0.6), the density deviation in the pressing direction is small, and thus this magnetic ring may be accomplished in the prior art. The too large aspect ratio (greater than 10) of the magnetic ring will bring a greater difficulty to the forming of the magnetic ring and a subsequent assembly process.

Further, the bonded magnetic ring according to the present invention has a wall thickness of greater than 1 mm, preferably 1-20 mm, and further preferably 1-5 mm. If the wall thickness of the magnetic ring is too small (less than 1 mm), it is very difficult to prepare the magnetic ring and the magnetic ring is easily damaged. If the wall thickness of the magnetic ring is too large (greater than 20 mm), as no pressing is not performed in a radial direction and the bonding strength is too weak, too large wall thickness is unfavorable for integral forming of the magnetic ring, also does not conform to the trend of light weight, and limits the assembly process and application fields of the magnetic ring.

Further, the SmFeN permanent magnetic powder has a particle size of 1-30 μm, preferably 3-10 μm. If the particle size of the SmFeN permanent magnetic powder is too small (less than 1 μm), the magnetic property significantly decreases, and in addition, there are a high difficulty in preparation and a high possibility of oxidation; and if the particle size of the SmFeN permanent magnetic powder is too large (>30 μm), it is impossible to effectively fill gaps in the NdFeB permanent magnetic powder in a pressing process and thus the pressing density is low.

A second aspect of the present invention provides a preparation method of an anisotropic bonded magnet for manufacturing the above anisotropic bonded magnet. A two-step forming process is adopted in this method, that is, the method is a method for preparing an anisotropic bonded magnetic ring (in the following of the present invention, the anisotropic bonded magnet takes the magnetic ring as a specific embodiment, but is not limited to the magnetic ring structure) by pre-forming at room temperature and an orientation and warm-pressing forming. A plurality of pre-pressed magnetic ring preforms having different properties is prepared by the process of pre-forming at room temperature, and in the orientation and warm-pressing forming process, the plurality of pre-pressed magnetic ring preforms are stacked and pressed, wherein the magnetic rings in the middle have high properties and the magnetic rings at two ends have low properties. Specifically, the method includes the following processes as shown in FIG. 1.

In step 1, raw materials of the bonded magnetic ring are prepared.

The raw materials of the bonded magnetic ring include an R-T-B type permanent magnetic powder, an SmFeN permanent magnetic powder, a thermosetting resin binder, a coupling agent, a lubricant and the like.

The rare earth element R constituting the R-T-B type permanent magnetic powder of the present invention may be one element or two or more elements selected from the group consisting of Y, Pr, Nd, Pm, Sm, Eu, Gd, Tb, Ho, Er, Tm, Yb and Lu, and is preferably Nd or PrNd for reasons of cost and magnetic property. The element T constituting the R-T-B type rare-earth magnet powder is Fe or FeCo. The thermosetting resin binder is a thermosetting resin such as an epoxy resin, a phenol resin, etc. The coupling agent is a silane coupling agent, titanate and the like. The lubricant is paraffin wax, stearate, silicone oil, and the like.

Based on the weight content of the R-T-B type permanent magnetic powder and the SmFeN permanent magnetic powder being 100, the weight content of the SmFeN permanent magnetic powder is 3%-40% of the weight content of the R-T-B type permanent magnetic powder, the weight content of the binder is 1.0%-6.0%, preferably 2.5%-3.5% of the weight content of the R-T-B type permanent magnetic powder and the SmFeN permanent magnetic powder, the weight content of the coupling agent is 0.05%-1.0%, preferably 0.1%-0.3% of the weight content of the R-T-B type permanent magnetic powder and the SmFeN permanent magnetic powder, and the weight content of the lubricant is 0.05%-2.0%, preferably 0.05%-0.50% of the weight content of the R-T-B type permanent magnetic powder and the SmFeN permanent magnetic powder.

In step 2, mixing is performed: the R-T-B type permanent magnetic powder and the SmFeN permanent magnetic powder in the raw materials are uniformly mixed with the thermosetting resin binder, the coupling agent and the lubricant to acquire a composite magnetic powder.

Specifically, the coupling agent metered in the above step is dissolved in a corresponding organic solvent, and then is uniformly mixed with the R-T-B type permanent magnetic powder and the SmFeN permanent magnetic powder, so that the surface of the anisotropic magnetic powder is uniformly coated with the coupling agent after the organic solvent is removed through volatilization; and subsequently the metered binder and lubricant are dissolved in a corresponding solvent, and then are uniformly mixed with the R-T-B type permanent magnetic powder coated with the coupling agent, so that the composite magnetic powder required for preparing the bonded magnet is acquired after the organic solvent is removed.

A plurality of composite magnetic powders having different magnetic properties (different SmFeN contents) and/or densities is prepared.

In step 3, pre-forming at room temperature is performed.

The plurality of dried composite magnetic powders is put in a mold cavity and then the mold cavity is placed in a magnetic field $H_1$ for press-forming to acquire a plurality of different preforms, wherein the pressing pressure is 100-600 MPa, the magnetic field $H_1$ is less than 0.15 T, and the forming temperature is room temperature.

The preforms have a density of 3.6-5.0 g/cm$^3$. Since the strength of the preforms decreases with a decrease in density, when the density is lower than 3.6 g/cm$^3$, the strength of the preforms is lower and the preforms cannot be kept intact during handling; and when the density is higher than 5.0 g/cm$^3$, it is difficult to acquire a high degree of orientation during the subsequent warm-pressing and magnetic field orientation.

Specifically, the preforms include two types, one is prepared from a composite magnetic powder with a lower content of SmFeN permanent magnetic powder, and the other is prepared from a composite magnetic powder with a low content of SmFeN permanent magnetic powder. The content of SmFeN in the composite magnetic powder with the lower content of SmFeN permanent magnetic powder is 3%-15%, preferably 5%-13%, and the content of SmFeN in the composite magnetic powder with the higher content of SmFeN permanent magnetic powder is 15%-40%, preferably 15%-30%.

Specifically, the preforms include two types, i.e., a first preform and a second preform. The first preform has a density less than that of the second preform and the ratio of the densities of the first preform and the second preform is 1:1.1-1:1.5.

Further, the first preform and the second preform are magnetic cylinders or magnetic rings having the same shape, and the ratio of the number of the first preforms to the number of the second preforms is 1:1-10:1.

In step 4, warm-pressing and magnetic field orientation forming is performed.

The plurality of demoulded different preforms is stacked and put in another mold and the another mold is placed in a magnetic field $H_2$ for warm-pressing forming and orientation, wherein the preforms having high properties are put in the middle and the preforms having low properties are put at two ends; or the preforms having high properties are put in the center and the preforms having low properties are put at the periphery; and pressing is performed again. Specifically, the densities and/or SmFeN contents of the preforms arranged from the middle to two ends gradually decrease; or the densities and/or SmFeN contents of the preforms arranged from the center to the periphery gradually decrease.

In the process of stacking the preforms, the preforms are positioned in such a manner that they attract one another through magnetic forces.

In the process of stacking the preforms, the middle preforms have a length less than that of upper and lower preforms. Specifically, the middle preforms have a length less than that of the preforms at each end.

The intensity of the magnetic field $H_2$ is 0.6-3 T, the pressing pressure is 300-1000 MPa, the forming temperature is 60-200° C., and the rate of gap is 0.5-40%. From the perspective of a two-step operation process and improving the magnetic properties, the gap between the preform and a warm-pressing and magnetic field orientation forming mold is preferably 3.5%-25%.

Subsequently, demagnetization, cooling and demolding are performed to acquire an anisotropic bonded magnetic ring. Demagnetization is one of alternating current pulse demagnetization and reverse pulse demagnetization.

(5) In step 5, curing is performed.

A curing process is that: the finally-formed preforms are heated to certain temperature and then heat preservation is performed for further improving the strength of the bonded magnetic ring. The heat preservation temperature is generally 100-200° C., preferably 120-180° C. and the heat preservation time is generally 0.5-2 hours, which may be adjusted properly based on the size of the magnetic ring.

Specific embodiments of the present invention are described below, but the present invention is by no means limited to the embodiments.

Embodiment 1

(1) Preparation of Raw Materials of Bonded Magnetic Ring

An NdFeB anisotropic permanent magnetic powder containing 29.5 wt. % of Nd, an SmFeN anisotropic permanent magnetic powder, a thermosetting resin binder, i.e., an epoxy resin, a coupling agent, i.e., silane and a lubricant, i.e., zinc stearate are prepared.

Based on the weight content of the NdFeB anisotropic permanent magnetic powder being 100, there are two batches of SmFeN anisotropic permanent magnetic powders which are different in content, the mass percentage content of SmFeN in the first batch is 9% and the mass percentage content of SmFeN in the second batch is 23%. Then based on the total weight content of the NdFeB anisotropic permanent magnetic powder and the SmFeN anisotropic permanent magnetic powder being 100, the weight content of the epoxy resin is 3%; the weight content of silane is 0.2%; and the weight content of zinc stearate is 0.25%.

(2) Mixing

The metered silane is dissolved in an organic solvent, i.e., acetone, and then is placed, together with two batches of anisotropic permanent magnetic powders which are different in content of SmFeN above respectively, in a vacuum mixing stirrer for uniform mixing. After the acetone is volatilized, the surfaces of the magnetic powders are uniformly coated with the silane. Next, the metered epoxy resin and zinc stearate are dissolved in acetone and then uniformly mixed with the anisotropic permanent magnetic powders coated with the silane. After the acetone is volatilized, two batches of composite magnetic powders having different properties for the bonded magnet are prepared.

(3) Pre-Forming at Room Temperature

The two composite magnetic powders prepared above are dried and then put in a mold cavity and the mold cavity is placed in a magnetic field $H_1=0$ for pressing forming to acquire different preforms, wherein the pressing pressure is 350 MPa, and the contents of SmFeN in a first preform and a second preform are 9% and 23% respectively.

In this embodiment, the magnetic ring formed by pressing has an aspect ratio of 1.25 and a wall thickness of 2 mm. According to an actual situation, the ratio of the number of the first preforms to the number of the second preforms is 2:1.

(4) Warm-Pressing and Magnetic Field Orientation Forming

The above different preforms are stacked and put in another mold and the another mold is placed in a magnetic field $H_2$ (2.5 T) for warm-pressing forming and orientation. The pressing pressure is 700 MPa, the forming temperature is 150° C. and a rate of gap between the preform and a mold cavity is 5%. The second preforms having high properties and higher densities are put in the middle and the first preforms having lower properties and densities are put at two ends. The first preforms have a height greater than that of the second preforms; and the plurality of preforms are positioned in such a manner that they attract one another through magnetic forces for warm-pressing, orientation and pressing forming.

Subsequently, demagnetization, cooling and demolding are performed to acquire an anisotropic bonded magnetic ring.

(5) Curing

The finally-formed preform acquired above is heated to 160° C. for curing, and this temperature is kept for 1 hour, so that the anisotropic magnetic ring is prepared.

Embodiment 2

(1) Preparation of Raw Materials of Bonded Magnetic Ring

An NdFeB anisotropic permanent magnetic powder containing 29.5 wt. % of Nd, an SmFeN anisotropic permanent magnetic powder, a thermosetting resin binder, i.e., an epoxy resin, a coupling agent, i.e., silane and a lubricant, i.e., zinc stearate are prepared.

Based on the weight content of the NdFeB anisotropic permanent magnetic powder being 100, there are two batches of SmFeN anisotropic permanent magnetic powders which are different in content, the mass percentage content of SmFeN in the first batch is 5% and the mass percentage content of SmFeN in the second batch is 23%. Then based on the total weight content of the NdFeB anisotropic permanent magnetic powder and the SmFeN anisotropic permanent magnetic powder being 100, the weight content of the epoxy resin is 3%; the weight content of silane is 0.2%; and the weight content of zinc stearate is 0.25%.

(2) Mixing

The metered silane is dissolved in an organic solvent, i.e., acetone, and then is placed, together with two batches of anisotropic permanent magnetic powders which are different in content of SmFeN above respectively, in a vacuum mixing stirrer for uniform mixing. After the acetone is volatilized, the surfaces of the magnetic powders are uniformly coated with the silane. Next, the metered epoxy resin and zinc stearate are dissolved in acetone and then uniformly mixed with the anisotropic permanent magnetic powders coated with the silane. After the acetone is volatilized, two batches of composite magnetic powders having different properties for the bonded magnet are prepared.

(3) Pre-Forming at Room Temperature

The two composite magnetic powders prepared above are dried and then put in a mold cavity and the mold cavity is placed in a magnetic field $H_1=0$ for pressing forming to acquire different preforms, wherein the pressing pressure is 350 MPa, the contents of SmFeN in a first preform and a second preform are 5% and 23% respectively.

In this embodiment, the magnetic ring formed by pressing has an aspect ratio of 1.25 and a wall thickness of 2 mm. According to an actual situation, the ratio of the number of the first preforms to the number of the second preforms is 2:1.

Other steps are the same as those of Embodiment 1.

Embodiment 3

(1) Preparation of Raw Materials of Bonded Magnetic Ring

An NdFeB anisotropic permanent magnetic powder containing 29.5 wt. % of Nd, an SmFeN anisotropic permanent magnetic powder, a thermosetting resin binder, i.e., an epoxy resin, a coupling agent, i.e., silane and a lubricant, i.e., zinc stearate are prepared.

Based on the weight content of the NdFeB anisotropic permanent magnetic powder being 100, there are two batches of SmFeN anisotropic permanent magnetic powders which are different in content, the mass percentage content of SmFeN in the first batch is 15% and the mass percentage content of SmFeN in the second batch is 23%. Then based on the total weight content of the NdFeB anisotropic permanent magnetic powder and the SmFeN anisotropic permanent magnetic powder being 100, the weight content of the epoxy resin is 3% of the weight of the NdFeB anisotropic permanent magnetic powder; the weight content of silane is 0.2% of the weight of the NdFeB anisotropic permanent magnetic powder; and the weight content of zinc stearate is 0.25% of the weight of the NdFeB anisotropic permanent magnetic powder.

(2) Mixing

The metered silane is dissolved in an organic solvent, i.e., acetone, and then is placed, together with two batches of anisotropic permanent magnetic powders which are different in content of SmFeN above respectively, in a vacuum mixing stirrer for uniform mixing. After the acetone is volatilized, the surfaces of the magnetic powders are uniformly coated with the silane. Next, the metered epoxy resin and zinc stearate are dissolved in acetone and then uniformly mixed with the anisotropic permanent magnetic powders coated with the silane. After the acetone is volatilized, two batches of composite magnetic powders having different properties for the bonded magnet are prepared.

(3) Pre-Forming at Room Temperature

The two composite magnetic powders prepared above are dried and then put in a mold cavity and the mold cavity is placed in a magnetic field $H_1=0$ for pressing forming to acquire different preforms, wherein the pressing pressure is 350 MPa, the contents of SmFeN in a first preform and a second preform are 15% and 23% respectively.

In this embodiment, the magnetic ring formed by pressing has an aspect ratio of 1.25 and a wall thickness of 2 mm. According to an actual situation, the ratio of the number of the first preforms to the number of the second preforms is 2:1.

Other steps are the same as those of Embodiment 1.

Embodiment 4

(1) Preparation of Raw Materials of Bonded Magnetic Ring

An NdFeB anisotropic permanent magnetic powder containing 29.5 wt. % of Nd, an SmFeN anisotropic permanent magnetic powder, a thermosetting resin binder, i.e., an epoxy resin, a coupling agent, i.e., silane and a lubricant, i.e., zinc stearate are prepared.

Based on the weight content of the NdFeB anisotropic permanent magnetic powder being 100, there are two batches of SmFeN anisotropic permanent magnetic powders which are different in content, the mass percentage content of SmFeN in the first batch is 9% and the mass percentage content of SmFeN in the second batch is 15%. Then based on the total weight content of the NdFeB anisotropic permanent magnetic powder and the SmFeN anisotropic permanent magnetic powder being 100, the weight content of the epoxy resin is 3%; the weight content of silane is 0.2%; and the weight content of zinc stearate is 0.25%.

(2) Mixing

The metered silane is dissolved in an organic solvent, i.e., acetone, and then is placed, together with two batches of anisotropic permanent magnetic powders which are different in content of SmFeN above respectively, in a vacuum mixing stirrer for uniform mixing. After the acetone is volatilized, the surfaces of the magnetic powders are uniformly coated with the silane. Next, the metered epoxy resin and zinc stearate are dissolved in acetone and then uniformly mixed with the anisotropic permanent magnetic powders coated with the silane. After the acetone is volatilized, two batches of composite magnetic powders having different properties for the bonded magnet are prepared.

(3) Pre-Forming at Room Temperature

The two composite magnetic powders prepared above are dried and then put in a mold cavity and the mold cavity is placed in a magnetic field $H_1=0$ for pressing forming to acquire different preforms, wherein the pressing pressure is 350 MPa, the contents of SmFeN in a first preform and a second preform are 9% and 15% respectively.

In this embodiment, the magnetic ring formed by pressing has an aspect ratio of 1.25 and a wall thickness of 2 mm. According to an actual situation, the ratio of the number of the first preforms to the number of the second preforms is 2:1.

Other steps are the same as those of Embodiment 1.

Embodiment 5

(4) Preparation of Raw Materials of Bonded Magnetic Ring

An NdFeB anisotropic permanent magnetic powder containing 29.5 wt. % of Nd, an SmFeN anisotropic permanent magnetic powder, a thermosetting resin binder, i.e., an epoxy resin, a coupling agent, i.e., silane and a lubricant, i.e., zinc stearate are prepared.

Based on the weight content of the NdFeB anisotropic permanent magnetic powder being 100, there are two batches of SmFeN anisotropic permanent magnetic powders which are different in content, the mass percentage content of SmFeN in the first batch is 9% and the mass percentage content of SmFeN in the second batch is 25%. Then based on the total weight content of the NdFeB anisotropic permanent magnetic powder and the SmFeN anisotropic permanent magnetic powder being 100, the weight content of the epoxy resin is 3%; the weight content of silane is 0.2%; and the weight content of zinc stearate is 0.25%.

(5) Mixing

The metered silane is dissolved in an organic solvent, i.e., acetone, and then is placed, together with two batches of anisotropic permanent magnetic powders which are different in content of SmFeN above respectively, in a vacuum mixing stirrer for uniform mixing. After the acetone is volatilized, the surfaces of the magnetic powders are uniformly coated with the silane. Next, the metered epoxy resin and zinc stearate are dissolved in acetone and then uniformly mixed with the anisotropic permanent magnetic powders coated with the silane. After the acetone is volatilized, two batches of composite magnetic powders having different properties for the bonded magnet are prepared.

(6) Pre-Forming at Room Temperature

The two composite magnetic powders prepared above are dried and then put in a mold cavity and the mold cavity is placed in a magnetic field $H_1=0$ for pressing forming to acquire different preforms, wherein the pressing pressure is 350 MPa, and the contents of SmFeN in a first preform and a second preform are 9% and 25% respectively.

In this embodiment, the magnetic ring formed by pressing has an aspect ratio of 1.25 and a wall thickness of 2 mm. According to an actual situation, the ratio of the number of the first preforms to the number of the second preforms is 2:1.

Other steps are the same as those of Embodiment 1.

Embodiment 6

(1) Preparation of Raw Materials of Bonded Magnetic Ring

An NdFeB anisotropic permanent magnetic powder containing 29.5 wt. % of Nd, an SmFeN anisotropic permanent magnetic powder, a thermosetting resin binder, i.e., an epoxy resin, a coupling agent, i.e., silane and a lubricant, i.e., zinc stearate are prepared.

Based on the weight content of the NdFeB anisotropic permanent magnetic powder being 100, there are two batches of SmFeN anisotropic permanent magnetic powders which are different in content, the mass percentage content of SmFeN in the first batch is 9% and the mass percentage content of SmFeN in the second batch is 23%. Then based on the total weight content of the NdFeB anisotropic permanent magnetic powder and the SmFeN anisotropic permanent magnetic powder being 100, the weight content of the epoxy resin is 1%; the weight content of silane is 0.2%; and the weight content of zinc stearate is 0.25%.

Other steps are the same as those of Embodiment 1.

Embodiment 7

(2) Preparation of Raw Materials of Bonded Magnetic Ring

An NdFeB anisotropic permanent magnetic powder containing 29.5 wt. % of Nd, an SmFeN anisotropic permanent magnetic powder, a thermosetting resin binder, i.e., an epoxy resin, a coupling agent, i.e., silane and a lubricant, i.e., zinc stearate are prepared.

Based on the weight content of the NdFeB anisotropic permanent magnetic powder being 100, there are two batches of SmFeN anisotropic permanent magnetic powders which are different in content, the mass percentage content of SmFeN in the first batch is 9% and the mass percentage content of SmFeN in the second batch is 23%. Then based on the total weight content of the NdFeB anisotropic permanent magnetic powder and the SmFeN anisotropic permanent magnetic powder being 100, the weight content of the epoxy resin is 5%; the weight content of silane is 0.2%; and the weight content of zinc stearate is 0.25%.

Other steps are the same as those of Embodiment 1.

Embodiment 8

(1) Preparation of Raw Materials of Bonded Magnetic Ring

An NdFeB anisotropic permanent magnetic powder containing 29.5 wt. % of Nd, an SmFeN anisotropic permanent magnetic powder, a thermosetting resin binder, i.e., an epoxy resin, a coupling agent, i.e., silane and a lubricant, i.e., zinc stearate are prepared.

Based on the weight content of the NdFeB anisotropic permanent magnetic powder being 100, there are two batches of SmFeN anisotropic permanent magnetic powders which are different in content, the mass percentage content of SmFeN in the first batch is 9% and the mass percentage content of SmFeN in the second batch is 23%. Then based on the total weight content of the NdFeB anisotropic permanent magnetic powder and the SmFeN anisotropic permanent magnetic powder being 100, the weight content of the epoxy resin is 3%; the weight content of silane is 0.2%; and the weight content of zinc stearate is 0.25%.

(2) Mixing

The metered silane is dissolved in an organic solvent, i.e., acetone, and then is placed, together with two batches of anisotropic permanent magnetic powders which are different in content of SmFeN above respectively, in a vacuum mixing stirrer for uniform mixing. After the acetone is volatilized, the surfaces of the magnetic powders are uniformly coated with the silane. Next, the metered epoxy resin and zinc stearate are dissolved in acetone and then uniformly mixed with the anisotropic permanent magnetic powders coated with the silane. After the acetone is volatilized, two batches of composite magnetic powders having different properties for the bonded magnet are prepared.

(3) Pre-Forming at Room Temperature

The two composite magnetic powders prepared above are dried and then put in a mold cavity and the mold cavity is placed in a magnetic field H1=0 for pressing forming to acquire different preforms, wherein the pressing pressure is 350 MPa, the contents of SmFeN in a first preform and a second preform are 9% and 23% respectively.

In this embodiment, the magnetic ring formed by pressing has an aspect ratio of 1.25 and a wall thickness of 2 mm. According to an actual situation, the ratio of the number of the first preforms to the number of the second preforms is 2:1.

(4) Warm-Pressing and Magnetic Field Orientation Forming

The above different preforms are stacked and put in another mold and the another mold is placed in a magnetic field $H_2$ (2.5 T) for warm-pressing forming and orientation, wherein the pressing pressure is 700 MPa, the forming temperature is 150° C. and a rate of gap between the preform and a mold cavity is 5%; the second preforms having high properties and higher densities are put in the middle and the first preforms having lower properties and densities are put at two ends; the first preforms have a height greater than that of the second preforms; and the plurality of preforms are positioned in such a manner that they attract one another through magnetic forces for warm-pressing, orientation and pressing forming.

Subsequently, demagnetization, cooling and demolding are performed to acquire an anisotropic bonded magnetic ring.

(5) Curing

The finally-formed preform acquired above is heated to 120° C. for curing, and this temperature is kept for 1 hour, so that the anisotropic magnetic ring is prepared.

Other steps are the same as those of Embodiment 1.

Embodiment 9

(1) Preparation of Raw Materials of Bonded Magnetic Ring

An NdFeB anisotropic permanent magnetic powder containing 29.5 wt. % of Nd, an SmFeN anisotropic permanent magnetic powder, a thermosetting resin binder, i.e., an epoxy resin, a coupling agent, i.e., silane and a lubricant, i.e., zinc stearate are prepared.

Based on the weight content of the NdFeB anisotropic permanent magnetic powder being 100, there are two batches of SmFeN anisotropic permanent magnetic powders which are different in content, the mass percentage content of SmFeN in the first batch is 9% and the mass percentage content of SmFeN in the second batch is 23%. Then based on the total weight content of the NdFeB anisotropic permanent magnetic powder and the SmFeN anisotropic permanent magnetic powder being 100, the weight content of the epoxy resin is 3%; the weight content of silane is 0.2%; and the weight content of zinc stearate is 0.25%.

(2) Mixing

The metered silane is dissolved in an organic solvent, i.e., acetone, and then is placed, together with two batches of anisotropic permanent magnetic powders which are different in content of SmFeN above respectively, in a vacuum mixing stirrer for uniform mixing. After the acetone is volatilized, the surfaces of the magnetic powders are uniformly coated with the silane. Next, the metered epoxy resin and zinc stearate are dissolved in acetone and then uniformly mixed with the anisotropic permanent magnetic powders coated with the silane. After the acetone is volatilized, two batches of composite magnetic powders having different properties for the bonded magnet are prepared.

(3) Pre-Forming at Room Temperature

The two composite magnetic powders prepared above are dried and then put in a mold cavity and the mold cavity is placed in a magnetic field H1=0 for pressing forming to acquire different preforms, wherein the pressing pressure is 350 MPa, the contents of SmFeN in a first preform and a second preform are 5% and 13% respectively.

In this embodiment, the magnetic ring formed by pressing has an aspect ratio of 1.25 and a wall thickness of 2 mm. According to an actual situation, the ratio of the number of the first preforms to the number of the second preforms is 2:1.

(4) Warm-Pressing and Magnetic Field Orientation Forming

The above different preforms are stacked and put in another mold and the another mold is placed in a magnetic field $H_2$ (2.5 T) for warm-pressing forming and orientation, wherein the pressing pressure is 700 MPa, the forming temperature is 150° C. and a rate of gap between the preform and a mold cavity is 5%; the second preforms having high properties and higher densities are put in the middle and the first preforms having lower properties and densities are put at two ends; the first preforms have a height greater than that of the second preforms; and the plurality of preforms are positioned in such a manner that they attract one another through magnetic forces for warm-pressing, orientation and pressing forming.

Subsequently, demagnetization, cooling and demolding are performed to acquire an anisotropic bonded magnetic ring.

(5) Curing

The finally-formed preform acquired above is heated to 180° C. for curing, and this temperature is kept for 1 hour, so that the anisotropic magnetic ring is prepared.

Other steps are the same as those of Embodiment 1.

Comparative Example 1

(1) Preparation of Raw Materials of Bonded Magnetic Ring

An NdFeB anisotropic permanent magnetic powder containing 29.5 wt. % of Nd, an SmFeN anisotropic permanent magnetic powder, a thermosetting resin binder, i.e., an epoxy resin, a coupling agent, i.e., silane and a lubricant, i.e., zinc stearate are prepared.

Based on the weight content of the NdFeB anisotropic permanent magnetic powder being 100, the mass percentage content of SmFeN is 3%. Then based on the total weight content of the NdFeB anisotropic permanent magnetic powder and the SmFeN anisotropic permanent magnetic powder being 100, the weight content of the epoxy resin is 3%; the weight content of silane is 0.2%; and the weight content of zinc stearate is 0.25%.

(2) Mixing

The metered silane is dissolved in an organic solvent, i.e., acetone, and then is placed, together with two batches of anisotropic permanent magnetic powders which are different in content of SmFeN above respectively, in a vacuum mixing stirrer for uniform mixing. After the acetone is volatilized, the surfaces of the magnetic powders are uniformly coated with the silane. Next, the metered epoxy resin and zinc stearate are dissolved in acetone and then uniformly mixed with the anisotropic permanent magnetic powders coated with the silane. After the acetone is volatilized, two batches of composite magnetic powders having different properties for the bonded magnet are prepared.

(3) Pre-Forming at Room Temperature

The two composite magnetic powders prepared above are dried and then put in a mold cavity and the mold cavity is placed in a magnetic field $H_1=0$ for pressing forming to acquire preforms, wherein the pressing pressure is 350 MPa, and the content of SmFeN in the preform is 5%.

In this example, the magnetic ring formed by pressing has an aspect ratio of 1.25 and a wall thickness of 2 mm. According to an actual situation, the ratio of the number of the first preforms to the number of the second preforms is 2:1.

Other steps are the same as those of Embodiment 1.

Comparative Example 2

(4) Preparation of Raw Materials of Bonded Magnetic Ring

An NdFeB anisotropic permanent magnetic powder containing 29.5 wt. % of Nd, an SmFeN anisotropic permanent magnetic powder, a thermosetting resin binder, i.e., an epoxy resin, a coupling agent, i.e., silane and a lubricant, i.e., zinc stearate are prepared.

Based on the weight content of the NdFeB anisotropic permanent magnetic powder being 100, the mass percentage content of SmFeN is 40%. Then based on the total weight content of the NdFeB anisotropic permanent magnetic powder and the SmFeN anisotropic permanent magnetic powder being 100, the weight content of the epoxy resin is 3%; the weight content of silane is 0.2%; and the weight content of zinc stearate is 0.25%.

(5) Mixing

The metered silane is dissolved in an organic solvent, i.e., acetone, and then is placed, together with two batches of anisotropic permanent magnetic powders which are different in content of SmFeN above respectively, in a vacuum mixing stirrer for uniform mixing. After the acetone is volatilized, the surfaces of the magnetic powders are uniformly coated with the silane. Next, the metered epoxy resin and zinc stearate are dissolved in acetone and then uniformly mixed with the anisotropic permanent magnetic powders coated with the silane. After the acetone is volatilized, two batches of composite magnetic powders having different properties for the bonded magnet are prepared.

(6) Pre-Forming at Room Temperature

The two composite magnetic powders prepared above are dried and then put in a mold cavity and the mold cavity is placed in a magnetic field $H1=0$ for pressing forming to acquire preforms, wherein the pressing pressure is 350 MPa, and the content of SmFeN in the preform is 13%.

In this example, the magnetic ring formed by pressing has an aspect ratio of 1.25 and a wall thickness of 2 mm. According to an actual situation, the ratio of the number of the first preforms to the number of the second preforms is 2:1.

Other steps are the same as those of Embodiment 1.

After the prepared magnetic ring is magnetized, surface magnetism distribution at the upper and lower ends and in the middle and a radial crushing force are tested, and then the magnetic ring is cut into 3 segments to acquire data of densities and properties of two ends and the middle, and the axial distribution uniformity of the density and property is evaluated, as shown in table 1.

TABLE 1

|  | Surface magnetism (kGs) | | | | Density (g/cm³) | | | | Radial crushing force (N) |
| --- | --- | --- | --- | --- | --- | --- | --- | --- | --- |
|  | Upper portion | Middle portion | Lower portion | Maximum surface magnetism difference | Upper portion | Middle portion | Lower portion | Maximum density difference | |
| Embodiment 1 | 1.69 | 1.67 | 1.67 | 1.18% | 6.02 | 5.95 | 5.99 | 1.16% | 457 |
| Embodiment 2 | 1.63 | 1.61 | 1.63 | 1.23% | 6.00 | 5.99 | 6.00 | 0.17% | 435 |
| Embodiment 3 | 1.72 | 1.69 | 1.70 | 1.74% | 6.11 | 6.00 | 6.08 | 1.80% | 468 |
| Embodiment 4 | 1.70 | 1.67 | 1.68 | 1.76% | 6.00 | 5.94 | 5.99 | 1.00% | 453 |
| Embodiment 5 | 1.70 | 1.73 | 1.69 | 1.73% | 6.09 | 5.97 | 6.05 | 1.97% | 461 |
| Embodiment 6 | 1.69 | 1.67 | 1.69 | 1.18% | 6.08 | 6.01 | 6.07 | 1.15% | 415 |
| Embodiment 7 | 1.59 | 1.57 | 1.58 | 1.26% | 5.87 | 5.78 | 5.85 | 1.53% | 478 |
| Embodiment 8 | 1.69 | 1.67 | 1.69 | 1.18% | 6.07 | 5.99 | 6.05 | 1.32% | 409 |
| Embodiment 9 | 1.59 | 1.56 | 1.57 | 1.89% | 6.05 | 5.98 | 6.03 | 1.15% | 465 |
| Comparative example 1 | 1.49 | 1.38 | 1.49 | 4.33% | 6.02 | 5.81 | 5.99 | 3.49% | 455 |
| Comparative example 2 | 1.75 | 1.59 | 1.73 | 9.14% | 6.14 | 5.80 | 6.13 | 5.54% | 463 |

In summary, for the anisotropic bonded magnet and the preparation method thereof according to the present invention, through a method of stacking magnets which are different in content of SmFeN and/or density, the magnets in the middle have high properties and the magnets at two ends and/or the periphery have low properties, thereby compensating for a property deviation caused by a difference in pressing densities during a pressing process, and improving the property uniformity of the magnets in an axial direction. The method avoids the phenomenon of non-uniform magnetic field orientation and density in a height direction during orientation and densification as well as the phenomenon of low in the middle and high at two ends. The anisotropic bonded magnet prepared by this method has the characteristic that a density deviation in a pressing direction is less than 2%; and the degree of orientation and density of the magnet as well as the property uniformity and the dimensional accuracy of the magnet are effectively improved.

It should be understood that the above specific embodiments of the present invention are merely intended to exemplarily illustrate or explain the principle of the present invention, and do not constitute a limitation to the present invention. Therefore, any modifications, equivalent replacements, improvements and the like made without departing from the spirit and scope of the present invention should be included within the scope of protection of the present invention. In addition, the appended claims of the present invention are intended to cover all changes and modifications that fall within the scope and boundary of the appended claims or equivalents of the scope and boundary.

What is claimed is:

1. An anisotropic bonded magnet, comprising an R-T-B permanent magnetic powder and an SmFeN permanent magnetic powder, wherein in the R-T-B permanent magnetic powder, the content of R is 28-31 wt. %, the content of B is 0.9-1.1 wt. %, and the balance is T; R is selected from one and more rare earth elements, T comprises Fe or FeCo and a small amount of transitional metal, and B is boron;

the content of the SmFeN permanent magnetic powder is 5%-30% of the weight content of the R-T-B permanent magnetic powder; and the anisotropic bonded magnet is formed by pressing a plurality of different preforms, wherein the plurality of different preforms comprises preforms which are different in density and/or content of SmFeN permanent magnetic powder, and the plurality of different preforms comprises a first preform and a second preform, wherein a mass percentage content of SmFeN in the composite magnetic powder of the first preform is 5-13%, and a mass percentage content of SmFeN in the composite magnetic powder of the second preform is 15-30%; and a ratio of the density of the first preform and the second preform is 1:1.1 to 1:1.5;

and in the magnet, the densities and/or SmFeN contents of the preforms arranged from the middle to two ends gradually decrease; or the densities and/or SmFeN contents of the preforms arranged from the center to the periphery gradually decrease; and the resulting anisotropic bonded magnet has a density deviation of less than 2% in a pressing direction;

wherein the bonded magnet is a bonded magnetic ring having an aspect ratio of 2 to 8.

2. The anisotropic bonded magnet according to claim 1, wherein R is one element or two or more elements selected from the group consisting of Y, Pr, Nd, Pm, Sm, Eu, Gd, Tb, Ho, Er, Tm, Yb and Lu.

3. The anisotropic bonded magnet according to claim 2, wherein R is Nd, or Pr and Nd.

4. The anisotropic bonded magnet according to claim 1, wherein the bonded magnetic ring having a wall thickness of greater than 1 mm.

5. The anisotropic bonded magnet according to claim 4, wherein the bonded magnet is a bonded magnetic ring having a wall thickness of 1-20 mm.

6. The anisotropic bonded magnet according to claim 1, wherein the SmFeN permanent magnetic powder has a particle size of 1-30 μm.

7. The anisotropic bonded magnet according to claim 6, wherein the SmFeN permanent magnetic powder has a particle size of 3-10 μm.

* * * * *